US012775871B2

(12) United States Patent
Schmidt et al.

(10) Patent No.: US 12,775,871 B2
(45) Date of Patent: Oct. 27, 2026

(54) EDGE DEVICE AWARE MACHINE LEARNING AND MODEL MANAGEMENT

(71) Applicant: NEC Laboratories Europe GmbH, Heidelberg (DE)

(72) Inventors: Mischa Schmidt, Heidelberg (DE); Tobias Jacobs, Heidelberg (DE)

(73) Assignee: NEC CORPORATION, Tokyo (JP)

( * ) Notice: Subject to any disclaimer, the term of this patent is extended or adjusted under 35 U.S.C. 154(b) by 1210 days.

(21) Appl. No.: 17/437,846

(22) PCT Filed: May 17, 2019

(86) PCT No.: PCT/EP2019/062878
§ 371 (c)(1),
(2) Date: Sep. 10, 2021

(87) PCT Pub. No.: WO2020/182320
PCT Pub. Date: Sep. 17, 2020

(65) Prior Publication Data

US 2022/0156642 A1 May 19, 2022

(30) Foreign Application Priority Data

Mar. 12, 2019 (EP) .................................... 19162219

(51) Int. Cl.
*G06N 20/00* (2019.01)
*G06F 11/30* (2006.01)
(Continued)

(52) U.S. Cl.
CPC ........... *G06N 20/00* (2019.01); *G06F 11/302* (2013.01); *G06F 18/217* (2023.01); *G06F 18/285* (2023.01); *G06F 2201/865* (2013.01)

(58) Field of Classification Search
CPC ............................ G06N 3/045; G06N 3/0464
See application file for complete search history.

(56) References Cited

U.S. PATENT DOCUMENTS

| | | | |
|---|---|---|---|
| 9,965,720 | B2 | 5/2018 | Lin et al. |
| 10,108,962 | B1 | 10/2018 | Sadaghiani et al. |

(Continued)

FOREIGN PATENT DOCUMENTS

| | | | |
|---|---|---|---|
| CN | 106068520 | A | 11/2016 |
| WO | WO 2018/053717 | A1 | 3/2018 |

OTHER PUBLICATIONS

NPL Bolukbasi Adaptive Neural Networks for Efficient Inference D3 2017.*

(Continued)

*Primary Examiner* — Paul M Knight
(74) *Attorney, Agent, or Firm* — Leydig, Voit & Mayer, Ltd.

(57) ABSTRACT

A method of solving a machine learning (ML) problem using a resource-constrained device includes generating and training, by an automated machine learning (autoML) engine, a model set including a number of different models. Each of the different models of the model set is specialized for a particular situation. Input data of the ML problem is monitored and one or more of the models are selected as active models to be applied by the resource-constrained device. The resource-constrained device receives input data of the ML problem and applies the selected model(s) to the received input data. The method can be applied to a number of use cases in artificial intelligence (AI), such as for face recognition, translations, traffic control or medical/health-care to optimize processes or predictions or to support decision making.

20 Claims, 2 Drawing Sheets

(51) Int. Cl.
*G06F 18/20* (2023.01)
*G06F 18/21* (2023.01)

(56) References Cited

U.S. PATENT DOCUMENTS

| | | | |
|---|---|---|---|
| 2011/0213997 A1 | 9/2011 | Kansal et al. | |
| 2012/0053925 A1 | 3/2012 | Geffin et al. | |
| 2014/0237595 A1 | 8/2014 | Sridhara et al. | |
| 2015/0170053 A1 | 6/2015 | Miao | |
| 2015/0373043 A1 | 12/2015 | Wang et al. | |
| 2018/0012145 A1 | 1/2018 | Maurya et al. | |
| 2018/0060759 A1 | 3/2018 | Chu et al. | |
| 2018/0109495 A1* | 4/2018 | Vasseur | H04L 63/0245 |
| 2018/0276564 A1 | 9/2018 | Varma et al. | |
| 2018/0314971 A1 | 11/2018 | Chen et al. | |
| 2019/0036716 A1 | 1/2019 | Kasaragod et al. | |
| 2019/0332895 A1* | 10/2019 | Anghel | H04L 41/145 |
| 2020/0125956 A1* | 4/2020 | Ravi | G06N 3/045 |
| 2022/0091837 A1* | 3/2022 | Chai | G06F 8/36 |
| 2022/0156642 A1* | 5/2022 | Schmidt | G06N 20/00 |

OTHER PUBLICATIONS

NPL Han MCDNN Approximation Based Execution Framework 2016.*
NPL Kim Dynamic Security Level Maximization D2 2017.*
NPL Masoudnia Mixture of experts a literature survey D4 2012.*
NPL McCaffrey Machine Learning with IoT Devices on the Edge 2018.*
NPL Wang Local Supervised Learning through Space Partitioning D5 2012.*
NPL Jiang Efficient Deep Learning Inference on Edge Devices 2018.*
NPL Ran DeepDecision a Mobile Deep Learning Framework 2018.*
Seungyeop Han et al: "MCDNN: An Approximation-Based Execution Framework for Deep Stream Processing Under Resource Constraints", Mobile Systems, Applications, and Services, ACM, 2 Penn Plaza, Suite 701 New York NY 10121-0701 USA, Jun. 20, 2016 (Jun. 20, 2016), pp. 123-136, XP058259698.
Tolga Bolukbasi et al: "Adaptive Neural Networks for Efficient Inference", Sep. 18, 2017 (Sep. 18, 2017), XP055534700, arXiv:1702.07811v2, Arxiv, Cornell University, US, pp. 1-10.
Saeed Masoudnia et al: "Mixture of experts: a literature survey", Artificial Intelligence Review, vol. 42, No. 2, May 12, 2012 (May 12, 2012), pp. 275-293, XP055314957, Springer Science+Business B.V., Germany.
Joseph Wang et al: "Local Supervised Learning through Space Partitioning", Proceedings of Advances in Neural Information Processing Systems 25 (NIPS 2012), Canada, Dec. 8, 2012 (Dec. 8, 2012), pp. 91-99, XP055481543.
Ben Taylor et al: "Adaptive deep learning model selection on embedded systems", Languages, Compilers, and Tools for Embedded Systems, ACM, 2 Penn Plaza, Suite 701New York NY 10121-0701 USA, Jun. 19, 2018 (Jun. 19, 2018), pp. 31-43, XP058410039.
Chi-Hung Hsu et al.: "MONAS: Multi-Objective Neural Architecture Search", Dec. 3, 2018, arXiv:1806.10332v2, Arxiv, Cornell University, US, pp. 1-8.
Xiao He and Luis Moreira-Matias, "Robust Continuous Co-Clustering", Feb. 14, 2018, arxiv:1802.05036v1, Arxiv, Cornell University, US, pp. 1-20.
Anumalasetty, Krishna, "New Automated Machine Learning Capabilities in Azure Machine Learning Service," Dec. 4, 2018, Microsoft, US, pp. 1-11.
Yang, Yi et al. "Deploy Large-Scale Deep Neural Networks in Resource Constrained Iot Devices With Local Quantization Region," May 24, 2021, arXiv:1805.09473v1, Arxiv, Cornell University, US, pp. 1-8.
Muhammad Habib Ur Rehman et al. "RedEdge: A Novel Architecture for Big Data Processing in Mobile Edge Computing Environments," Journal of Sensor and Actuator Networks, Aug. 15, 2017, MDPI, Switzerland, pp. 1-22.
Kim Joongheon et al: "Dynamic Security-Level Maximization for Stabilized Parallel Deep Learning Architectures in Surveillance Applications", 2017 IEEE Symposium on Privacy-Aware Computing (PAC), IEEE , Aug. 1, 2017 (Aug. 1, 2017), US, pp. 192-193, XP033264253.

* cited by examiner

EDGE DEVICE AWARE MACHINE LEARNING AND MODEL MANAGEMENT

CROSS REFERENCE TO RELATED APPLICATIONS

This application is a U.S. National Phase application under 35 U.S.C. § 371 of International Application No. PCT/EP2019/062878, filed on May 17, 2019, and claims benefit to European Patent Application No. EP 19162219.0, filed on Mar. 12, 2019. The International Application was published in English on Sep. 17, 2020, as WO 2020/182320 A1 under PCT Article 21(2).

FIELD

The present disclosure relates to automatic machine learning (autoML), and in particular to a method and a system of solving a machine learning (ML) problem using a resource-constrained device.

BACKGROUND

Generally, automated machine learning (autoML) denotes the process of automating the end-to-end process of applying machine learning to real-world problems. More specifically, autoML is a specialized instance of an optimization task: selecting the appropriate machine learning algorithm from a set of algorithms (e.g. Support Vector Machine, SVM), configuring the algorithm's hyperparameters (e.g. the SVM kernel to use), possibly also selecting and configuring input data preprocessing steps (e.g. k-means clustering, selecting k) and selecting and configuring optimizers that "train" the machine learning algorithm (e.g. RMSprop choosing the learning rate). Various autoML approaches have been proposed, such as, for instance, evolutionary algorithms, reinforcement learning, and Bayesian optimization. Commonly, autoML approaches try different combinations of selected ML algorithms, preprocessing steps and hyper-parameter configurations in an iterative, evolutionary or parallel process. AutoML approaches differ in the heuristics to choose the next combination(s) to try. Some algorithms do so based on the performance of already tried algorithms and configurations, others choose at random.

Current research on automatically configured machine learning (ML) models (autoML) focuses on achieving the best possible accuracy for a given ML problem, ideally as fast as possible. However, for resource-constrained devices such as edge devices, for instance, there are more aspects than model accuracy that have to be taken into account. For example, CPU power, memory constraints, or even cache-sizes can all impact e.g. the runtime required to execute a single classification model. In various scenarios, the time to execute a model to classify data samples is critical, for example, in real-time video object detection executed on a security camera.

Nearly all state of the art methods for autoML attempt to optimize model accuracy using as little computational resources as possible during training time. While this is an important goal due to the large training effort of modern machine learning models, like deep Neural Networks, the time required to execute the models on new data is usually not taken into account by the autoML processes. A notable exception is the work by Chi-Hung Hsu et al.: "MONAS: Multi-Objective Neural Architecture Search", Dec. 3, 2018, available at https://arxiv.org/abs/1806.10332, where a weighted combination of energy consumption (measured on the GPU in the computing system training the ML model) and accuracy is optimized. In MONAS, the resource requirements become additional objectives of the autoML process. However, when applying MONAS to generate a model for a resource-constrained edge device, the model produced will have limited accuracy.

SUMMARY

In an embodiment, the present disclosure provides a method of solving a machine learning (ML) problem using a resource-constrained device. The method includes generating and training, by an automated machine learning (autoML) engine, a model set including a number of different models for the ML problem. Each of the different models of the model set is specialized for a particular situation. The method further includes monitoring, by a monitoring and decision module, input data of the ML problem and selecting one or more models of the model set as active models to be applied by the resource-constrained device. The method also includes receiving, by the resource-constrained device, input data of the ML problem and applying the one or more models selected by the monitoring and decision module to the received input data.

BRIEF DESCRIPTION OF THE DRAWINGS

Subject matter of the present disclosure will be described in even greater detail below based on the exemplary figures. All features described and/or illustrated herein can be used alone or combined in different combinations. The features and advantages of various embodiments will become apparent by reading the following detailed description with reference to the attached drawings, which illustrate the following.

DETAILED DESCRIPTION

Figure 1:
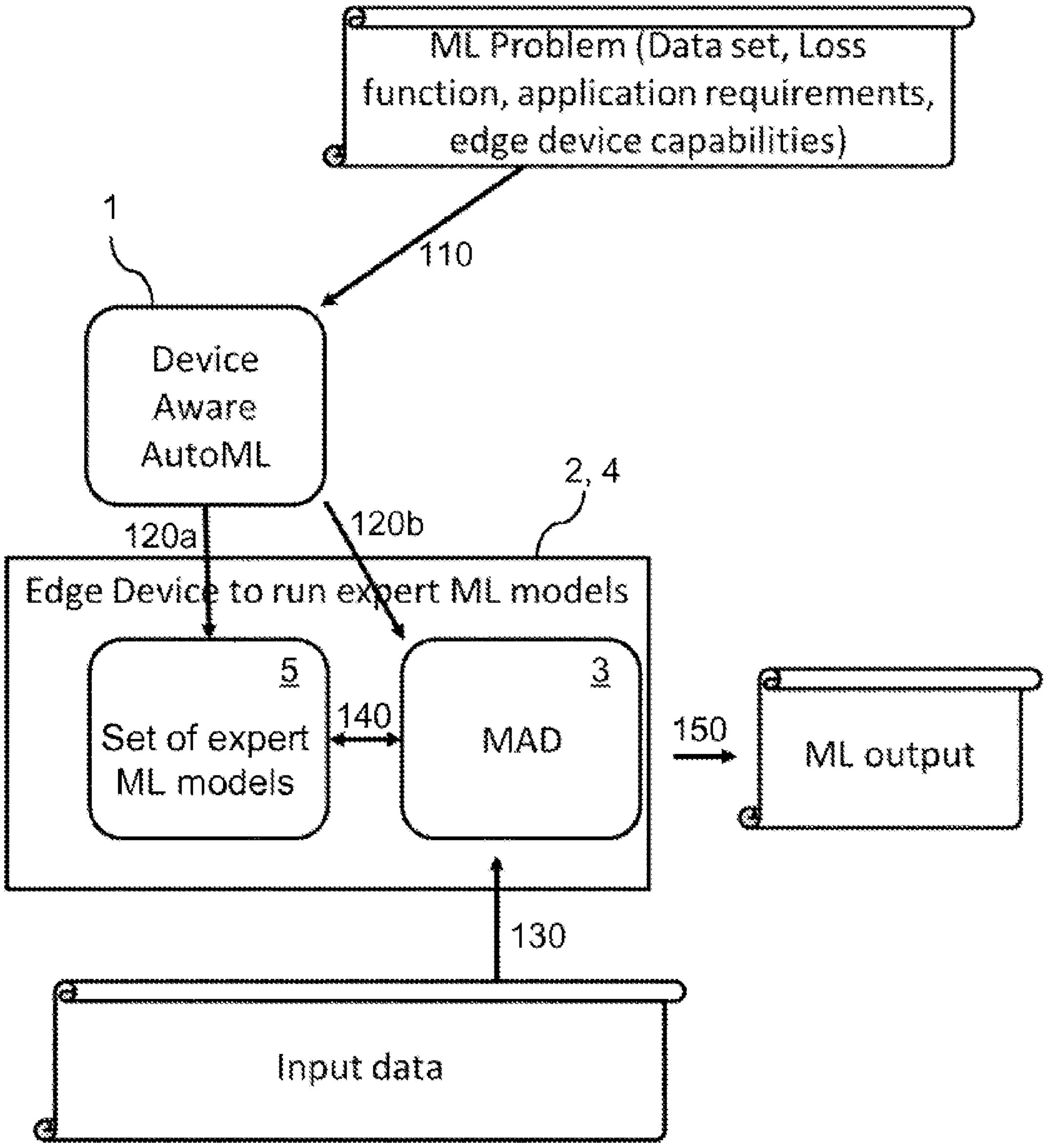
FIG. 1 schematically shows a system of solving a machine learning, ML, problem with an edge device hosting a monitoring and decision module in accordance with an embodiment, and FIG. 2 schematically shows a system of solving a machine learning, ML, problem with an edge device managed by a cloud-based monitoring and decision module in accordance with an embodiment.

The present disclosure provides an improved and further developed method and system for solving a machine learning, ML, problem using a resource-constrained device in such a way that an optimized model accuracy under the resource constraints of the resource-constrained device is achieved.

According to an aspect of the present disclosure, a method is provided for solving a machine learning, ML, problem using a resource-constrained device. The method includes:

- by an automated machine learning, autoML, engine, generating and training a model set including a number of different models for the ML problem, wherein each of the different models of the model set is specialized for a particular situation,
- by a monitoring and decision module, monitoring input data of the ML problem and selecting one or more models of the model sets as active models to be applied by the resource-constrained device, and
- by the resource-constrained device, receiving input data of the ML problem and applying the one or more models selected by the monitoring and decision module to the received input data.

According to an aspect of the present disclosure, a system is provided for solving a machine learning, ML, problem. The system includes:

an automated machine learning, autoML, engine that is configured to generate and train a model set including a number of different models for the ML problem, wherein each of the different models of the model set is specialized for a particular situation, a monitoring and decision module that is configured to monitor input data of the ML problem and to select one or more models of the model set as active models to be applied by the resource-constrained device, and a resource-constrained device that is configured to receive input data of the ML problem and to apply the one or more models selected by the monitoring and decision module to the received input data.

According to the present disclosure, it has been recognized an increased average model accuracy on resource-constrained devices, such as edge devices, can be achieved by applying autoML mechanisms for generating multiple models for the ML problem to be solved by the resource-constrained device, wherein these multiple trained models are specialized for different situations, and by monitoring input data of the ML problem and selecting one or more models from the multiple trained models as active models that are to be applied by the resource-constrained device. As a result, the present disclosure enriches automatic machine learning (autoML) with the capability to train models that are specialized for resource-constrained computation devices. The model accuracy under such resource constraints is optimized by training several models, each of which is specialized to a specific situation, for instance in terms of data characteristics, data input rate, and/or execution context.

More specifically, it has been recognized that under resource constraints the possible size of models is restricted, and that generic models that are applicable to all situations can only satisfy the resource constraints at the price of a lower accuracy. When using specialized models, the sacrifice of accuracy for the sake of computation time is lower. Furthermore, it has been recognized that the autoML process of selecting the architecture and hyper-parameters of the models, as well as the training of the models, does not need to satisfy the same resource requirements. These steps can take place on more powerful (e.g. cloud) machines, and/or it is feasible for these steps to consume more time, energy, and other resources. In other words, the powerful device, i.e. the autoML engine, solves the autoML problem and, given an edge device specification, provides as output a set of expert models together with a configuration, strategy, rule set or function that indicates when which model is to be executed in what situation.

The present disclosure provides the additional advantage of maintaining a higher throughput of model predictions/classifications under resource constraints and prediction accuracy requirements. The disclosure allows computing on the edge device, i.e. avoids relying on high data rate uplinks and enhances data privacy, for example in the context of face recognition performed by video cameras.

According to embodiments of the disclosure, the resource-constrained device may be an edge device, such as a camera or a personal digital assistant.

According to embodiments the system may be configured in such a way that the monitoring and decision module runs on the resource-constrained or edge device. Alternatively, the monitoring and decision module may be implemented to run in a central server, or in a cloud-based setting. Depending on the implementation in place, input data that arrives at the resource-constrained device will be "routed" via appropriate communication paths to the active expert model as determined by the monitoring and decision module.

According to embodiments of the disclosure, an input dataset for the ML problem may be divided into multiple distinct regions in a "feature space", i.e. based on the features of the input data, and autoML mechanisms may be applied to each of the different regions to generate the model set in such a way that each of the different models of the model set is specialized for a particular region. For instance, in case the input data constitute images (e.g. of objects or of persons), the division of the input data set into multiple distinct regions may be performed by means of an approach of bag of (visual) words where input images are preprocessed by feature detectors (e.g. SIFT) and are then clustered by the k-means algorithm. Alternatively, the so-called ROCCO approach (as described in Xiao He and Luis Moreira-Matias: "Robust Continuous Co-Clustering", Feb. 14, 2018, available at https://arxiv.org/abs/1802.05036) may be applied. This approach allows co-clustering of input space (e.g. preprocessed image features) and output space (labels). Then, autoML may be applied to the images associated to each identified cluster. As will be easily appreciated by those skilled in the art, other input data preprocessing methods, like unsupervised pre-training (such as self-organizing maps, or the k-means clustering algorithm) can be applied as well.

As a result, the autoML mechanism will have trained a set of ML models, wherein each of the trained ML models of the set is an expert for a specific region of the input data space. The autoML mechanism may store the trained models (e.g. as a binary object) plus the preprocessing (e.g. if k-means clustering is used the cluster representatives) and the mapping of input data regions to expert models in a repository, e.g. a database. Hereinafter, expert models that are not executed at the edge device will be denoted as inactive, and the expert models that are currently running on the computing edge as active.

According to embodiments the monitoring and decision module, hereinafter sometimes briefly termed MAD module, may be configured to monitor (and if needed preprocess) the input data based on the aforementioned mappings. In particular, the MAD may be configured to decide to deactivate a currently active ML model and replace it by an already trained but inactive model. In order to accomplish this task, it may be favorable for the MAD module to track the statistics of input data (and its features if preprocessing is used). For instance, the MAD module may create a histogram over the past time period (e.g. the last 2 hours) indicating which clusters were present or which expert models would be most appropriate. Based thereupon, the MAD module may select one or more of the trained models of the model set generated by the autoML engine and may activate this/these model(s) by exchanging respective signaling messages with the resource-constrained device. Advantageously, the MAD module may use a hysteresis on these statistics and decision boundaries, which may help to avoid oscillations of model activations and deactivations on the resource-constrained device.

It should be noted that embodiments of the present disclosure also include cases where the MAD module is configured to activate/deactivate multiple ML models on the edge device such that two or more learned ML model are active on the edge device concurrently. If multiple models are active, techniques of combining multiple active models' outputs from the input data can be applied, such as weighted sums, majority votes, and/or building model ensembles.

According to embodiments the model selection/(de)activation logic/strategy of the MAD module is parametrized based on the characteristics of the autoML process. For example, in the above embodiment of data space regions, the number of clusters detected (which may be a consequence of the edge device's computational resources) and the associated learned expert models have to be configured. Moreover, a mapping of input data to the expert models has to be performed, i.e. by mapping the input data to the regions. Generally, the system according to embodiments of the disclosure relies on hard input space partitions due to edge device constraints. Thus, the result of hard input space partition is caused by a particular restriction on the autoML optimization process (the edge device's computational resources).

In general, a model selection strategy of the MAD module can also consist of a number of rules or a mathematical function of the input data at the edge device or of the edge device's status itself. In addition, aspects of input space partition for model creation and selection can be combined with the other embodiments' aspects and provide additional complexity for the MAD module.

According to embodiments of the disclosure, when the input data set is exhibiting time dynamics, as e.g. when processing captured video images, an assessment of the input data space division created during training may be performed. For instance, input data space regions may be clusters of visual words as created by the k-means clustering applied to e.g. ORB or SIF image features. By tracking the frequency of input data space region associations in a predefined period of the training input data, subsets of input data samples may be selected to train different ML algorithms on the different regions. This training is performed by applying autoML-typical techniques. This way, the MAD module is enabled to avoid a 'ping-pong' situation with too frequent activations and deactivations of trained ML models on the edge device as expert models are associated to handle input data space regions that frequently co-occur in a pre-defined period (assuming that the training data is representative of the runtime environment time dynamics).

According to embodiments the autoML process may be configured to generate a set of trained expert models including several models for different situations, where a situation is characterized with respect to (a) the time available to execute the model in the specific situation, and/or (b) the accuracy to be expected from the models in the specific situation. In this context the MAD module may be configured to select from the set of trained models for every input the model which maximizes the expected accuracy without violating the resource constraints of the edge device, where the resource constraints may be dynamically adapted according to the current workload of the system, in particular the workload of the edge device itself.

For example, considering a system that comprises a video camera, an object detection method, and an object classification method. It may happen that, in some time periods, the object detection method detects only few objects and thus the classification method may have sufficient computational resources available to use a model, selected from the set of trained expert models, which has a relatively high complexity and accuracy for classification. Compared to this, in other time periods the number of objects detected may be large and a less accurate model has to be used by the classification method as otherwise the object classification frequency cannot keep up with the frequency of object detection and some objects remain unclassified.

According to embodiments, in which the set of trained expert models include models was varying complexities, models may be used that do not only report their predictions, but additionally provide information on their confidence about the prediction. A particular example of such models are ensembles of small atomic models, where the level of confidence can be derived by the degree of consent between the individual atomic models. Whenever the confidence of a model with low resource requirement is high, i.e. above a pre-configured first threshold, the prediction of this model may become the final output. On the other hand, when the confidence is low, i.e. below a pre-configured second threshold, and computational resources are available at the edge device, the current data sample(s) may be fed into a more complex model. This way the used computational resources are adapted to the difficulty of each particular sample. According to a more sophisticated approach, embodiments of the disclosure may extend the above process to a hierarchically organized structure of models with varying accuracy and resource requirements. Moreover, buffer management strategies may be used to select for each data sample in the edge device's buffer an appropriate model such that the average accuracy is optimized under the constraint that no buffer overflows happen.

FIG. 1 schematically illustrates an exemplary system implementation according to a first embodiment. As shown in FIG. 1, the system comprises an autoML engine 1, a resource-constrained device 2, and a monitoring and decision module 3. The resource-constrained device 2 is an edge device 4 such as, e.g., a camera. In the embodiment of FIG. 1, the monitoring and decision, MAD, module 3 is running on the edge device 4, which also stores the set 5 of expert ML models learned by the autoML engine 1, as will be explained in more detail below.

Generally, the autoML engine 1 is configured to use autoML techniques to train several specialized models for specific situations that satisfy the resource constraints of the edge device 4 and the respective situation, and the MAD module 3 is configured to manage the activation of these models accordingly as derived in the training process. In this context it is important to note that the present disclosure is in no way limited with respect to the used autoML techniques, i.e. any autoML technique known from prior art may be employed to train the set 5 of expert models.

According to an embodiment the autoML engine 1 may be configured to use unsupervised learning mechanisms to divide the input data space into different regions, to apply autoML mechanisms to each region to derive dedicated models for each, and to instruct the MAD module 3 to assign a specialist model to each region so as to select the appropriate model when corresponding input data arrives. According to an alternative embodiment the autoML engine 1 may be configured to use unsupervised learning mechanisms to divide the input space into different regions with respect to the arrival time of the data samples (e.g. images), to apply autoML mechanisms upon each region to derive dedicated models for each, and to instruct the MAD module 3 when to switch between the models (i.e. by deactivating a currently applied model and by activating another model from the set 5 of trained models to be applied henceforth).

Generally, when the input data set is exhibiting any time dynamics, an assessment of the input data space division created during a training phase may be performed in accordance with following exemplary pseudocode algorithm 1:

```
Algorithm 1:
        Comment: Iterative learning with application-specific minimum acceptable test
        accuracy for image classification on edge device using bag of visual words.
        Basically: assign to each sliding window of images within the training set a ML
        module. Sliding window shrinks until target test performance is reached. During
        production time, the most similar training window's cluster is assigned by MAD.
        The algorithm assumes access to an autoML module that has been configured with
        permissible hyper-parameter ranges deduced from the edge device specification
        already (e.g. memory limitations).
        Inputs:
            • labeled training and test data set (Images with known capture rate from
              video camera),
            • loss function,
            • required minimum classification accuracy
            • maximum permissible model change frequency (in sample time)
        Optional Input:
            • no of clusters //comment: often 1000-2000 clusters are used
        Output:
            • set of trained ML models
            • MAD configuration for runtime management
Training_sift= For image in training images: calculate image's SIFT descriptors
clusters = k-Means(no of clusters, training_sift)
For image in training images:
        Associate image's label to the clusters corresponding to image's SIFT descriptors
//the training images are now describable by the clusters that correspond to the SIF
descriptors. Every image is a collection of "visual words" → hence the term bag of
visual words.
//top down approach: iteratively reduce the period within the training set (and later
the MAD) during which we track cluster activations to associate ML models to the clusters.
For simplicity we use sampled images' index (i.e. sampling time) not hours or minutes.
//also possible: bottom up approach. Idea: requires an acceptable maximum update rate
for modules on the edge device. Then grow sliding window from "per sample" to multiple
hours so that when running through the training and test sets, the update rate is below
the acceptable update rate.
//initializations
Sliding_window = no_training_set images // initialize to full data set fed to autoML
module
Test_error = −1 //
finished=false
While not finished:
        noofwindows = no_training_set images -Sliding_window // deduct end of training
set
        //a matrix of zeros counting cluster occurences in different sliding windows
        Cluster_occurence_count = zeroes(noofwindows, noclusters)
        models trained = list ( ) //list to store trained models
        window_model_map = vector(windows) //each window points to a trained model.
        If Sliding_window == 0:
              Raise Error ("no configuration found meeting application accuracy targets")
        For index in range (noofwindows): //assumes starts index at 0
              Slide sliding_window one position further over training_set
              For image in sliding_window:
                      For all assigned clusters to image:
                              Cluster_occurence_count [index , assignedCluster] += 1
        normalize Cluster_occurence_count matrix per row to [0,1]
        #Iteratively create models. Then assigns models to similar cluster rows (i.e.
        sliding windows)
        #more complex creation of models possible, e.g. by clustering the sliding window
        descriptors
        #(the cluster_occurence_count rows).
        For index in range (noofwindows): //assumes starts index at 0
              Slide sliding_window one position further over training_set
              If index==0:
                      models_trained[0] = autoML (training_set [index* Sliding_window,
(index+1)* Sliding_window])
                      window_model_map = 0
              //different distance metrics possible, e.g. MSE or MAE
              id=find Cluster_occurence_count row closest to Cluster_occurence_count
        [index]
              //check if normalized distance to closest row is too big: create new autoML
        model
              if (Cluster_occurence_count row[id] - Cluster_occurence_count [index]) /
        noofwindows > threshold :
                      models_trained.append(autoML (sliding_window))
                      window_model_map[index] = len(models_trained)−1
```

-continued

```
        else:
                window_model_map[index] = id
    #now check test accuracy and swapping
    test windows= no_test_set images -Sliding_window
    lastModel=−1 //stores last used model index changes
    lastChange =0 //used to track MAD behavior avoiding too frequent model
                //changes
    For index in range (test_windows): //assumes starts index at 0
        //represents the window in terms of visual words.
        //an alternative would be to again cluster the visual words (of the windows)
    with
        //a "small enough" number of clusters to avoid frequent
        //model activations/deactivations on the edge device
        test_window_cluster = zeroes (noclusters)
        Slide sliding_window one position further over test_set
        For image in sliding_window:
                Clusteridxs = calculate SIFT descriptors, assign clusters from KNN
or FLANN
                test_window_cluster[Clusteridxs] =
test_window_cluster[Clusteridxs]+1 //this
        normalize test_window_cluster
        //first try to stick to last selection (avoid model changes on edge)
        If lastModel > −1:
                //calculate test accuracy for last model on this window and see if
        acceptable.
                model= models_trained[lastModel]
                Test_acc = model(sliding_window)
                If Test_acc > required_acc:
                        continue
        //else: we have to change the model. Check if frequency is too high. //Use
        sliding window index as a "time proxy".
                If (index - lastChange) / dataSampleFrequency >
        maxPermissibleSwapping:
                        TooFrequentChanges = TRUE
                Else:
                        id=find Cluster_occurence_count row closest to
                test_window_cluster
                        model= models_trained[window_model_map[id]]
                        //calculate test accuracy
                        Test_acc = model(sliding_window)
                        If Test_acc > required_acc:
                            Last model= window_model_map[id]
                            lastChange = index
        Else:
                            TestAccTooLow = TRUE
                If TestAccTooLow or TooFrequentChanges:
                        //configurable parameter: Stepsize, e.g. 1 hour.
                        Sliding_window = Sliding_window - StepSize
                        Continue //repeat with smaller window size
    //if we reach here: found a viable assignment with acceptable accuracy.
    //Now Configure MAD!
    Mad=CreateMAD ( )
    Mad.setModels(models_trained)
    Mad.setClusters(clusters)
    Mad.setRowClusters(Cluster_occurence_count row)
    Mad.setWindowModelMap(window_model_map)
    Mad.slidingWindowSize(Sliding_window)
    Mad.setNoClusters(noclusters)
    Return Mad
```

According to embodiments the autoML engine 1 may be configured to use autoML mechanisms to generate a trained set 5 of models including a number of models with varying tradeoffs between accuracy and resource requirements, wherein a switching (i.e. activation/deactivation) between the models is performed based on the arrival frequency of samples. Preferably, the set 5 of trained models includes models that—in addition to their predictions—provide information about the model's prediction confidence, wherein a switch from a currently applied model to a more accurate model may be performed when the currently applied model has low accuracy (i.e. below a configurable threshold) and when resources for the more complex model are available at the edge device 4.

Basically, the system is configured to perform a method for increasing the average model accuracy on the resource-constrained edge device 4, comprising the step of (i) setting up an optimization process with a training dataset for a specific task and for the specifications of the edge device 4 to select, configure and train machine learning algorithms, and (ii) executing the optimization process to generate a variety of models for the same task and a model switching strategy for the MAD module 3. The MAD module 3 may be configured to recognize a situation indicating the need for switching, e.g. certain input data characteristics, a certain data sample arrival rate at the edge device 4, or the current time. Using the model switching strategy, the MAD module 3 may select a model based on the recognized situation. The selected model may then be activated at the edge device 4, i.e. the edge device 4 uses the selected model for processing incoming data samples.

According to an embodiment, the MAD module 3 may perform runtime management of active ML models in accordance with the following exemplary pseudocode algorithm 2:

```
Algorithm 2:
//MAD runtime management of active ML modules on edge device
//Prerequisite: MAD is configured and parametrized, e.g. based on Algorithm 1 output.
//Mad : : check is called in synch with the sample interval of data, i.e. as new samples
arrive. In the
//initial condition, the Mad waits for a buffer of data to be filled.
//ActivateModel, DeactivateModel, CurrentlyActiveModel are functions assumed to be given
for
//managing the edge device.
check ( ) :
        select last images from dataBuffer of slidingWindowSize
        test_window_cluster = zeroes(number_clusters)
        For index in selectedImages:
                For image in sliding_window:
                        Descriptors = calculate SIFT descriptors,
                        Clusteridxs = assign clusters from KNN or FLANN to Descriptors
                        test_window_cluster[Clusteridxs] =                    \\
test_window_cluster[Clusteridxs] +1
                normalize test_window_cluster
        id=find Cluster_occurence_count row closest to test_window_cluster
        if currentlyActiveModel ( ) ==window_model_map [id] ] :
                return //do Nothing
        else: // alternatively we could allow to accept a different model if the found
occurrence
                //count row is "close enough" to the currently active model to avoid
        swapping too
                //frequently.
                //for now, swap model
                DeactivateModel ( )
                ActivateModel (models [window_model_map [id] ] )
                return
```

Turning now to FIG. 1, as shown in step 110, the autoML engine 1 gets access to the ML problem. This may include access to a training data set and to a problem specific loss function (e.g. cross entropy loss for classification). Moreover, the autoML engine 1, in order to become aware of the edge device 4, may be provided with a description of the edge device's 4 capabilities, which enables the autoML engine 1, e.g., to infer the speed of computation of expert models at the edge device 4. Still further, according to an embodiment the autoML engine 1 may be fed with a set of application requirements, such as a maximum allowable execution time per expert model on the edge device 4.

Based on the information received at step 110, the autoML engine 1 performs automated machine learning by applying prior art techniques, thereby generating and training a set 5 of expert ML models. As shown in steps 120*a* and 120*b*, as the result of the automated machine learning, the edge device 4 gets downloaded the set 5 of expert ML models (step 120*a*) together with a configured logic for the monitoring and decision module 3 (step 120*b*). In the embodiment of FIG. 1, the edge device 4 is capable of storing multiple ML models, but runtime constraints allow the edge device 4 to only run a single ML expert model at a time to meet application requirements.

When new input data arrives at the edge device 4, as shown in step 130, the MAD module 3 maps the input data to the appropriate expert model based on its internal configured logic (e.g. time based, or based on mapping the input data to a data space region determined during the machine learning training), thereby selecting from the trained set 5 of models a single expert model to be applied to the input data. Consequently, as shown in step 140, the MAD module 3 activates the selected expert model and presents the input data to that expert model. In return, the MAD module 3 receives a prediction from that expert model, as also indicated in step 140. The edge device 4 or, more specifically, either the selected expert model itself or the MAD module 3 (depending on the implementation), put out the result of applying the selected expert ML model to the input data, as shown in step 150. For instance, the results may be presented to a user or may be made available for further use in other applications.

Figure 2:
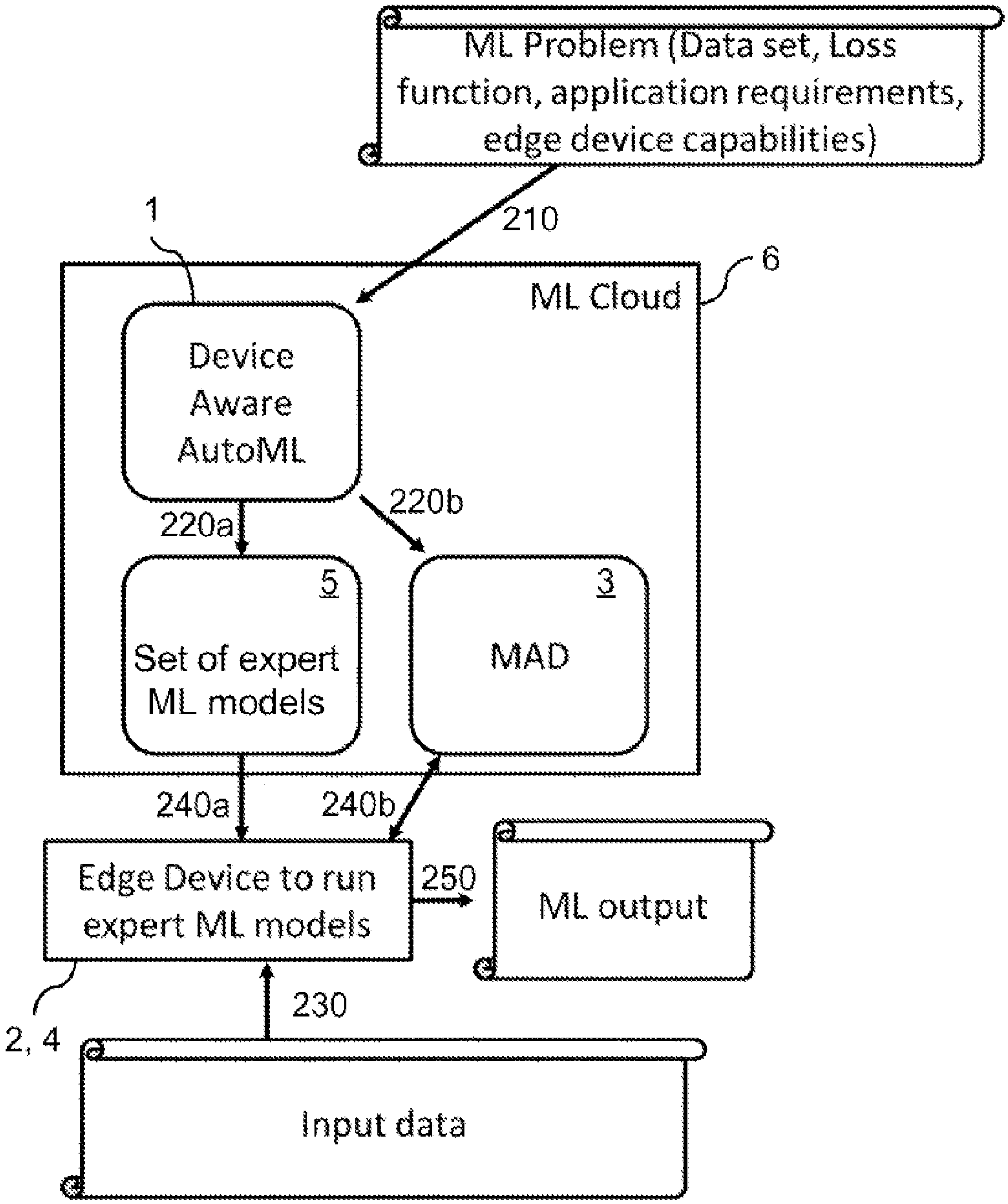

FIG. 2 schematically shows a system of solving a machine learning, ML, problem with an edge device 4 managed by a monitoring and decision module 3 in accordance with a second embodiment. The operating principle is basically the same as in the system of FIG. 1. In particular, in FIG. 2 like reference numerals denote like components as in FIG. 1 with identical or similar functionality.

Step 210 is the same as step 110 described above for FIG. 1. However, in contrast to the embodiment of FIG. 1, in FIG. 2 the MAD module 3 is not hosted by the edge device 4, but is implemented as a cloud-based MAD module 3. As shown in step 220*b*, the autoML engine 1 performs a transfer of a configured logic for the MAD module 3 within the cloud. In addition, the set 5 of trained expert ML models is also hosted in the cloud, denoted ML Cloud 6, instead of the edge device 4. Consequently, step 220*a* is implemented as a provision step of the set 5 of expert ML models within the cloud, as the result of the automated machine learning performed by the autoML engine 1.

As input data arrives to the edge device 4, as shown at step 230, it is processed by the expert model currently active at the edge device 4 and output is produced at step 250, in the same or a similar way as described above in connection with FIG. 1. However, the MAD module 3 hosted in the ML cloud system 6 can instruct the edge device 4 to download and activate a different expert ML model of the set 5 of trained expert ML models. For instance, one criterion for an activation instruction could be a time-based criterion. Upon receiving an activation instruction at step 240*b*, the edge device 4 downloads (and applies) the respective expert model from the cloud-based set 5 of trained expert ML models, as shown at step 240*a*.

It should be noted that further variants of technical implementation may be realized. For instance, a system implementation may be envisioned in which the MAD module 3 is running on the edge device 4, while the trained set 5 of expert models is hosted in the ML cloud 6.

Hereinafter, three different use cases will be described that can be realized based on the system implementations described above. It should be noted that various aspects of the embodiments of these use cases can be combined with each other (e.g. time, input space clustering, and data sample arrival frequency-based expert model creation and selection). However, for sake of exposition and clarity, the use case descriptions are kept simple.

1. Face Recognition in a Train Station

In a train station, an edge device 4, implemented in form of a camera, is intended to detect certain searched-for suspects of a crime. The camera is configured to only record snapshots if movement is detected when a light-barrier is triggered by passers-by. Naturally, the frequency of passers-by and thus of snapshots varies, for instance during off-peak hours the frequency will be lower than during rush-hour.

An entity or authority, e.g. the police, may provide pictures of suspects' faces to the autoML engine or server 1 along with a description of the edge device's 4 capabilities and/resources, such as working memory capacity and processing power. Furthermore, the frequency of the camera's snapshot taking is provided to the autoML server 1, for instance by the police providing respective video camera snapshots and light-barrier triggers information. This information can be used by the autoML training process to deduce a buffer fill status of the camera's buffer. In this context it is important to note that the arrival rate of snapshots fills the camera's buffer, while the execution of one or more models on the edge device 4 (i.e. the application of the models to buffered snapshots) takes the respective snapshots off the camera's buffer. The autoML process executed by the autoML server 1 then trains face recognition models for a configurable number of different snapshot taking frequencies as occurring in the training data. Typically, the faster executing models will have a lower accuracy and slower executing models will have a higher accuracy.

According to embodiments the autoML process executed by the autoML server 1 also deduces a strategy or logic for the MAD module 3 associated to the camera's buffer fill status, e.g.:

If N<20: use M1
If 20<=N<40: use M2
If 40<=N: use M3

In this example, N is the number of snapshot images in the camera's (i.e. the edge device's 4) buffer. Moreover, for the accuracy of the models it holds that M1>M2>M3 (i.e. M1 is the most accurate), and for the time required to execute the models it holds that M1>M2>M3 (i.e. M3 is the fastest to execute).

According to an embodiment of the above use case, which relates to an implementation according to FIG. 1, the MAD module 3 may be deployed on the camera along with the three models M1, M2 and M3. Alternatively, in an embodiment which relates to an implementation according to FIG. 2, the MAD module 3 may be implemented to run on a computing unit close to the camera device, e.g. on a PC in the train station, and the models M1, M2 and M3 are located also on the PC. The MAD module 3 may be configured to periodically monitor the buffer fill status of the edge device 2 (i.e. the camera). When the number N of snapshot images in the camera's buffer changes beyond the above defined thresholds, the MAD module 3 deactivates the current active model on the camera and replaces it with the model indicated by the MAD module's 3 strategy. For instance, when model M2 is currently active at the camera and the MAD module 3 detects a decrease of N below 20, model M2 will be deactivated and replaced by the more time consuming, but more accurate model M1. The respective model to be activated may be transferred or pushed onto the camera via a standard networking technology, e.g. FTP over WLAN.

In the particular case of face recognition as described above, the benefits of edge execution are increased data privacy since images do not leave the camera and only face recognition classification results are provided as output. Furthermore, the communication network bandwidth between camera and server is low since no images are transmitted but only classification results (and possibly, assuming an implementation according to the embodiment of FIG. 2, camera buffer fill status information and model management related traffic).

2. Translation Services

This use case relates to edge devices 4 running on personal assistants such as Amazon's Alexa. Current practice transmits the input data, i.e. the voice traffic, to a central server where voice recognition and natural language processing are executed.

In connection with an embodiment, it is assumed that each user in a home with a personal assistant would provide voice samples of himself to the autoML engine 1, e.g. by reading out some base text (much in analogy to earlier voice recognition software around the early 2000s). The training samples also include potentially different language texts per person. The autoML engine 1 then trains models on the input data and the ground truth (including texts and language information) and automatically finds the optimal set 5 of models and model selection rules to allow executing highly accurate voice based personal assistant services entirely on the edge device 4 itself. The switching logic itself may be a machine learning model that is executed on the input data inside the MAD module 3 that then selects the most appropriate of the deployed models, e.g. according to input audio related features. As will be appreciated by those skilled in the art, MAD module 3 deployment and model deployment variations in this use case are similar to the train station face recognition use case described above.

In the particular case of translation services, the benefits of edge execution are increased data privacy since recorded audio data does not leave the edge device 4 and only the service related internet requests are sent to the internet (e.g. the search query of the command "What is the capital of Germany?"). Furthermore, the communication network bandwidth between edge device 4 and internet is also lower.

3. Car Traffic Monitoring

A camera mounted on a smart city's traffic light monitors traffic, in particular by detecting and counting the number of cars. To save bandwidth it is intended not to feed the video recorded by the camera to the smart city's data center, but only the number of cars detected in each sampling period. To execute the car detection and counting on the edge device 4, i.e. the camera, the camera's capability specification along with video data recorded by the camera and time information on when each video frame was taken and how many cars are found within that period are provided to the autoML engine 1 for execution of an autoML process.

The autoML process determines that based on time of day, image characteristics change (e.g. brightness) and thus a number of different ML models should be trained, such as the following three models:

Night: darker images with artificial lighting and cars having headlights on causing reflections on the street, few pedestrians Dusk/Dawn: the special lighting conditions when sun sets are causing a variety of shadows, warm colors, headlights cause less reflections on the street Daytime: more or less bright light, headlights may be on or off without causing strong reflections on the street, more pedestrians The strategy or logic of the monitoring and decision module 3 to select a model as active model on the camera depends on daytime, e.g.:

If 20:00<current time <05:00: activate night model

If 05:00<current time <07:00 or 18:00<current time <20:00: activate dusk/dawn model Else: activate daytime model In a variation, additional expert models can be trained using, e.g., the input space clustering based on additional environmental information (e.g. weather conditions). For instance, the trained set 5 of expert models may include a model that is active only when it is cloudy or it rains and another model that is active only when the sun shines. This input space clustering of an additional variable impacts both the model generation and the respective MAD module 3 strategy. As will be appreciated by those skilled in the art, MAD module 3 deployment and model deployment variations in this use case are similar to the train station face recognition use case described above.

The benefits of edge execution in this use case are again and improved data privacy since recorded camera data does not leave the edge device 4 and only count information is provided to another party, such as the smart city traffic department. Furthermore, the communication network bandwidth requirement between the edge device 4 and internet is very low since no video is transmitted.

While subject matter of the present disclosure has been illustrated and described in detail in the drawings and foregoing description, such illustration and description are to be considered illustrative or exemplary and not restrictive. Any statement made herein characterizing the invention is also to be considered illustrative or exemplary and not restrictive as the invention is defined by the claims. It will be understood that changes and modifications may be made, by those of ordinary skill in the art, within the scope of the following claims, which may include any combination of features from different embodiments described above.

The terms used in the claims should be construed to have the broadest reasonable interpretation consistent with the foregoing description. For example, the use of the article "a" or "the" in introducing an element should not be interpreted as being exclusive of a plurality of elements. Likewise, the recitation of "or" should be interpreted as being inclusive, such that the recitation of "A or B" is not exclusive of "A and B," unless it is clear from the context or the foregoing description that only one of A and B is intended. Further, the recitation of "at least one of A, B and C" should be interpreted as one or more of a group of elements consisting of A, B and C, and should not be interpreted as requiring at least one of each of the listed elements A, B and C, regardless of whether A, B and C are related as categories or otherwise. Moreover, the recitation of "A, B and/or C" or "at least one of A, B or C" should be interpreted as including any singular entity from the listed elements, e.g., A, any subset from the listed elements, e.g., A and B, or the entire list of elements A, B and C.

The invention claimed is:

1. A method of solving a machine learning (ML) problem using a resource-constrained device, the method comprising:

generating and training, by an automated machine learning (autoML) engine, a model set including a number of different models for the ML problem, wherein each of the different models of the model set is generated for a different input data characteristic associated with a respective execution-based resource constraint, comprising:

dividing an input data set for the ML problem into multiple different regions of a feature space by clustering outputs of a feature detector, wherein each region is partitioned based on a respective different execution-based resource constraint for a same resource load, and generating the model set such that each of the divided input data sets is specialized for a particular region of the feature space, monitoring, by a monitoring and decision module, input data of the ML problem and selecting, based on one or more of the input data characteristics associated with the respective execution-based resource constraint being present in the input data, one or more models of the generated model set as active models to be applied by the resource-constrained device, and receiving, by the resource-constrained device, input data of the ML problem and applying the one or more models selected by the monitoring and decision module to the received input data.

2. The method according to claim 1, wherein the model set is configured to include a number of different models that satisfy resource constraints of the resource-constrained device.

3. The method according to claim 1, wherein the model set includes a number of different models having varying trade-offs between accuracy of the models and resource requirements of the models.

4. The method according to claim 1, wherein the different regions of the input data set are defined as distinct data space regions based on features of the input data.

5. The method according to claim 1, wherein the different regions of the input data set are defined based on time and/or frequency of input data arrival.

6. The method according to claim 1, wherein switching between the models of the model set that are selected to be applied by the resource-constrained device is performed based on an input data characteristic of a frequency of input data arrival at the resource-constrained device, a time of input data arrival at the resource-constrained device.

7. The method according to claim 1, further comprising, performing, by the monitoring and decision module:

monitoring an execution-based resource constraint of a buffer fill status of a buffer of the resource-constrained device, and applying a buffer management strategy configured to select, for each data sample in the buffer, a model of the model set that maximizes an average accuracy under the constraint that no buffer overflows occur.

8. The method according to claim 1, wherein the models of the model set are configured to provide information on a confidence of their predictions, and wherein an input data sample is fed into a model of higher complexity when the confidence of a model of lower complexity is below a configurable threshold and the resource-constrained device has sufficient computational resources available.

9. The method according to claim 1, wherein the execution-based resource constraint is based on an execution requirement that is independent of computing resource availability of the resource-constrained device.

10. The method according to claim 9, wherein the execution requirement is one of an available time to execute the one or more selected models, an expected accuracy of the one or more selected models, or a model execution context.

11. The method according to claim 1, wherein selecting, based on one or more of the input data characteristics being present in the input data, the one or more models of the model set further comprises selecting the one or more models based on a presence of a respective clustered output the one or more models are generated for.

12. The method according to claim 1, wherein generating the model set further comprises storing trained models of the model set, the clustered outputs of the feature detector and a mapping of the divided input data regions to the trained models of the model set in a database accessible to the resource-constrained device, and wherein the resource-constrained device is an edge device.

13. The method according to claim 1, wherein the feature space comprises one or more hard partitions between the multiple different regions each based on the respective resource constraint.

14. The method according to claim 1, wherein monitoring, by the monitoring and decision module, the input data further comprises monitoring a statistic of the input data and comparing the statistic with the respective execution-based resource constraint.

15. A system for solving a machine learning (ML) problem, the system comprising:

an automated machine learning (autoML) engine configured to generate and train a model set including a number of different models for the ML problem, wherein each of the different models of the model set is generated for a different input data characteristic associated with a respective execution-based resource constraint, comprising:

dividing an input data set for the ML problem type into multiple different regions of a feature space by clustering outputs of a feature detector, wherein each region is partitioned based on a respective different execution-based resource constraint for a same resource load, and generating the model set such that each of the divided input data sets is specialized for a particular region of the feature space, a monitoring and decision module configured to monitor input data of the ML problem and to select, based on one or more of the input data characteristics associated with the respective execution-based resource constraint being present in the input data, one or more models of the generated model set as active models to be applied by a resource-constrained device, and the resource-constrained device, configured to receive input data of the ML problem and to apply the one or more models selected by the monitoring and decision module to the received input data.

16. The system according to claim 15, wherein the resource-constrained device is an edge device.

17. The system according to claim 15, wherein the monitoring and decision module is configured to map the input data of the ML problem to at least one appropriate model of the model set.

18. The system according to claim 15, wherein the monitoring and decision module is configured to make decisions on deactivating a currently active model of the model set and replacing the currently active model by an inactive model of the model set.

19. The system according to claim 15, wherein the monitoring and decision module and the trained models of the model set for the ML problem are hosted on the resource-constrained device.

20. The system according to claim 15, wherein the monitoring and decision module is hosted in a cloud ML system, and wherein the monitoring and decision module is configured to instruct the resource-constrained device to download and activate one or more particular models of the model set.

* * * * *